(12) United States Patent
Liu

(10) Patent No.: US 9,750,282 B2
(45) Date of Patent: Sep. 5, 2017

(54) ELECTRONIC CIGARETTE AND AIR SWITCH THEREOF

(71) Applicant: Shenzhen Smoore Technology Limited, Shenzhen, Guangdong (CN)

(72) Inventor: Pingkun Liu, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 208 days.

(21) Appl. No.: 14/409,483

(22) PCT Filed: Sep. 12, 2014

(86) PCT No.: PCT/CN2014/086423
§ 371 (c)(1),
(2) Date: Dec. 19, 2014

(87) PCT Pub. No.: WO2016/037362
PCT Pub. Date: Mar. 17, 2016

(65) Prior Publication Data
US 2016/0106152 A1    Apr. 21, 2016

(51) Int. Cl.
H05B 1/02 (2006.01)
A24F 47/00 (2006.01)
G05D 7/06 (2006.01)
G01F 1/66 (2006.01)

(52) U.S. Cl.
CPC .......... A24F 47/008 (2013.01); G01F 1/661 (2013.01); G05D 7/0635 (2013.01); G05D 7/0694 (2013.01)

(58) Field of Classification Search
CPC .......... A24F 47/00; A24F 47/008; G01F 1/00; G05D 7/0635; G05D 7/0694
USPC .............................. 137/486, 487.5; 392/404
See application file for complete search history.

(56) References Cited

U.S. PATENT DOCUMENTS

| 5,247,827 | A | * | 9/1993 | Shah | G01N 15/0656 73/28.01 |
| 5,687,710 | A | * | 11/1997 | Ambrosio | A61M 15/0065 128/200.18 |
| 5,810,325 | A | * | 9/1998 | Carr | H02M 3/07 251/129.06 |
| 6,829,132 | B2 | * | 12/2004 | Martin | G02B 26/001 333/174 |
| 7,978,045 | B2 | * | 7/2011 | Lee | H01P 1/127 337/14 |
| 7,999,995 | B2 | * | 8/2011 | Hashimura | G02B 26/001 345/108 |
| 8,009,406 | B2 | * | 8/2011 | Gevorgyan | H01G 4/005 361/277 |

(Continued)

Primary Examiner — Thien S Tran
Assistant Examiner — Joe E Mills, Jr.

(57) ABSTRACT

The present invention provides an electronic cigarette and a battery device thereof. The air switch includes a switch body and an airflow channel extending through the switch body. In present invention, because the airflow channel is disposed within the switch body of the air switch, it is better to design the size of the airflow channel which extending through the air switch, at the same time, fixing mechanism for mounting the air switch, such as pad or welding points can be arranged out of the airflow channel, to protect the air sucked into the second airflow channel from being polluted, thereby protecting the consumers' health.

20 Claims, 10 Drawing Sheets

(56) References Cited

U.S. PATENT DOCUMENTS

| | | | | |
|---|---|---|---|---|
| 8,168,120 B1* | 5/2012 | Younis | G01N 29/022 | 422/68.1 |
| 8,499,766 B1* | 8/2013 | Newton | A24F 47/008 | 131/273 |
| 8,528,827 B2* | 9/2013 | Aoki | G06K 19/077 | 235/487 |
| 8,582,788 B2* | 11/2013 | Leidl | H04R 1/2838 | 381/173 |
| 8,997,753 B2* | 4/2015 | Li | H01C 17/00 | 128/202.21 |
| 9,016,124 B1* | 4/2015 | Younis | G01P 15/0891 | 257/415 |
| 9,022,026 B2* | 5/2015 | Fang | A24F 47/008 | 128/202.21 |
| 9,078,473 B2* | 7/2015 | Worm | A24F 47/008 | |
| 9,078,474 B2* | 7/2015 | Thompson | A24F 47/008 | |
| 2005/0016550 A1* | 1/2005 | Katase | A24F 47/002 | 131/194 |
| 2006/0196518 A1* | 9/2006 | Hon | A24F 47/002 | 131/360 |
| 2009/0195386 A1* | 8/2009 | Peter | G08B 13/2408 | 340/572.1 |
| 2012/0090630 A1* | 4/2012 | Hon | A24F 47/002 | 131/273 |
| 2012/0186594 A1* | 7/2012 | Liu | A24F 47/008 | 131/329 |
| 2012/0206012 A1* | 8/2012 | Rosenblatt | B81C 1/00142 | 310/300 |
| 2013/0061861 A1* | 3/2013 | Hearn | A24F 47/006 | 131/329 |
| 2014/0014126 A1* | 1/2014 | Peleg | A24F 47/008 | 131/329 |
| 2014/0060527 A1* | 3/2014 | Liu | A61M 15/06 | 128/202.21 |
| 2014/0150810 A1* | 6/2014 | Hon | A24F 47/008 | 131/329 |
| 2014/0166029 A1* | 6/2014 | Weigensberg | A24F 47/008 | 131/329 |
| 2015/0272223 A1* | 10/2015 | Weigensberg | G01R 31/3606 | 131/328 |
| 2015/0305410 A1* | 10/2015 | Liu | A24F 47/008 | 131/329 |
| 2016/0095357 A1* | 4/2016 | Burton | A24F 47/008 | 131/328 |
| 2016/0198767 A1* | 7/2016 | Verleur | A24F 47/008 | 392/386 |
| 2016/0213068 A1* | 7/2016 | Hon | A24F 47/002 | |

* cited by examiner

ELECTRONIC CIGARETTE AND AIR SWITCH THEREOF

BACKGROUND

1. Technical Field

The present disclosure relates to smokers products, and more particularly relates to an electronic cigarette and an air switch applied thereto.

2. Description of Related Art

The electronic cigarette is also known as a virtual cigarette or an electronic atomizer. As a substitute for cigarette, the electronic cigarette is usually used for smoking cessation. The appearance and taste of electronic cigarette are similar to those of the conventional cigarette, while it does not contain tar, suspended particles and other harmful ingredients as the conventional cigarette. The related electronic cigarette includes a housing an atomizer device, a battery device, a liquid solution reservoir, a mouthpiece, and an end cover. The atomizer device, the battery device and the liquid solution reservoir are housed in the housing. The mouthpiece and the end cover are respectively mounted to two opposite ends of the cylindrical housing. The related electronic cigarette functions as a substitute of tobacco in a certain extend.

For the related electronic cigarette, air entering into the related electronic cigarette passes through the peripheral of the air switch, and then reaches the atomizer device. However, a size of the airflow channel which passing through the air switch is difficult to retain in consistent, and when the air switch is applied to the electronic cigarette, fixing mechanism for mounting the air switch, such as pad or welding points, are generally disposed within the airflow channel, which may result in the air sucked into the airflow channel being polluted, to harm consumers' health.

SUMMARY

An improved electronic cigarette and an air switch thereof are provided to overcome the above-mentioned disadvantage.

To overcome the above mentioned disadvantage, an air switch is provided. The air switch includes a switch body and an airflow channel extending through the switch body.

In some embodiments, the switch body comprises an airflow sensor for sensing air passing through the airflow channel and a controlling device electrically connected to the airflow switch.

In some embodiments, the airflow sensor comprises a negative chamber communicating with the airflow channel, a balance chamber communicating with the outside of the air switch, a first electrode plate and a second electrode plate parallel to and being spaced apart from the first electrode plate; the second electrode plate comprises a conductive film, the conductive film is arranged between the negative chamber and the balance chamber, and cooperates with the first electrode plate to form a parallel-plate capacitor to sense a difference in the pressure between the negative chamber and the balance chamber; the parallel-plate capacitor is electrically connected to the controlling device, to transmit the difference signal to the controlling device.

In some embodiments, the switch body comprises a first air flowing pipe, a conductive case, a light emitting device, a first conductive bracket, an insulating gasket, and a second conductive bracket; the first air flowing pipe defines the airflow channel; The case comprises an annular bottom wall, a cylindrical sidewall protruding from an outer edge of the bottom wall, and a top wall fixed to a top end of the cylindrical sidewall away from the bottom wall; wherein the light emitting device comprises a driving circuit board, and a light emitting member fixed to a bottom surface of the driving circuit board; the driving circuit board defines a first central hole for allowing the second air flowing pipe extending through, and a plurality of first apertures arranged at a side of the first central hole; the driving circuit board is mounted on a top surface of the bottom wall and is electrically connected to the bottom wall; wherein the first conductive bracket is arranged on the top surface of the driving circuit board and is electrically connected to the driving circuit board; the first electrode plate is electrically connected to a top end of the first conductive bracket, the first electrode plate defines a second central hole for allowing the air flowing pipe extending through, and a plurality of second apertures; the second aperture are arranged surrounding the second central hole; The conductive film defines a third central hole for allowing the air flowing pipe extending through, the conductive film is mounted on the insulating gasket and is insulated from the first electrode plate, to cooperate with the second electrode plate to form a parallel-plate capacitor; the second conductive bracket is mounted on and electrically connected to the conductive film; wherein the controlling device comprises a controlling circuit board, the controlling circuit board define a fourth central hole for allowing the first air flowing pipe extending through, the controlling circuit board is disposed in the gap between the top wall of the case and the top end surface of the second conductive bracket, and is electrically connected to the top wall and the second conductive bracket; wherein the first air flowing pipe extends through the first central hole, the second central hole, the third central hole and the fourth central hole, and further electrically connect an inner wall of the controlling circuit board with the inner wall of the driving circuit board; wherein the conductive film, the first conductive bracket, the driving circuit board, the insulating gasket and the second air flowing pipe cooperatively define the balance chamber; the conductive film, the second conductive bracket, the controlling circuit board and the first air flowing pipe cooperatively define the annular negative chamber.

In some embodiments, the first air flowing pipe comprises a first pipe with the out diameter thereof increasing gradually, a second pipe, and a third pipe, the outer diameter of the first pipe is suitable for the diameter of the first central hole, the outer diameter of the second pipe is suitable for the diameter of the second central hole of the first electrode plate, the diameter of the inner gasket unit, the diameter of the third central hole of the second electrode plate, the diameter of the fourth central hole of the controlling circuit board respectively; a step between the first pipe and the second pipe abuts against and is electrically connected to the top surface of the driving circuit board, and a step between the second pipe and the third pipe abuts against and is electrically connected to the top surface of the controlling circuit board; the second pipe defines an extending hole for communicating the inner space of the second pipe with the negative chamber.

In some embodiments, the controlling device comprises a first pluggable conductive body, a second pluggable conductive body and a third pluggable conductive body, which are arranged on a top surface of the controlling circuit board; the second pluggable conductive body is electrically connected to one of the cathode and anode of the battery device, and the third pluggable conductive body is electrically connected to the other of the cathode and anode of the battery device; the first pluggable conductive body is electrically connected to the third pluggable conductive member via the controlling circuit board.

In some embodiments, the switch body further comprises an insulator, the insulator is substantially ring shaped, and is arranged between the first and second conductive brackets and the cylindrical sidewall of the case.

In some embodiments, the insulating gasket comprises an outer gasket unit and an inner gasket unit; the outer gasket unit and the inner gasket unit are mounted to the outer wall and inner wall of the first electrode plate respectively; the outer wall and the inner wall of the conductive film are supported by the outer gasket unit and the inner gasket unit respectively.

An electronic cigarette is also provided. The electronic cigarette includes each one of the above mentioned air switches.

In some embodiments, the electronic cigarette further includes a battery device; wherein the battery device comprises a cylindrical body and a second air flowing pipe extending axially through the cylindrical body, the second air flowing pipe is connected to an end of the first air flowing pipe.

In some embodiments, the electronic cigarette further includes an atomizer device mounting base; wherein the atomizer device mounting base communicates with an end of the second air flowing pipe away from the first air flowing pipe; the battery device further comprises comprising a first pluggable conductive member, a second pluggable conductive member, a third pluggable conductive member, a fourth pluggable conductive member, and a fifth pluggable conductive member, the first and second pluggable conductive members face the atomizer device mounting base, the third pluggable conductive member, the fourth pluggable conductive member, and the fifth pluggable conductive member face the air switch; the first pluggable conductive member is electrically connected to one of the anode and cathode of the battery device directly, the second pluggable conductive member is electrically connected to the third pluggable conductive member directly; the third pluggable conductive member, the fourth pluggable conductive member, and the fifth pluggable conductive member engage with the first pluggable conductive body, the second pluggable conductive body, and the third pluggable conductive body respectively, the third pluggable conductive body is electrically connected to the other one of the anode and cathode of the battery device.

In some embodiments, wherein the atomizer device mounting base comprises a main body, a supporting bear for mounting the atomizer device, and two fourth pluggable conductive bodies mounted to the bottom of the main body, the fourth pluggable conductive bodies engage with the first pluggable conductive member and the second pluggable conductive member respectively.

In some embodiments, wherein the main body comprises a top end surface and a bottom end surface opposite to the top end surface; the center of the top end surface recesses to form a receiving portion for receiving the supporting bear, the main body further defines a fifth central hole and two mounting holes arranged at opposite sides of the fifth central hole, the second central hole and the mounting holes extend from the bottom of the receiving portion to the bottom end surface, the second central hole is used for allowing air circulation, the mounting holes are used for mounting the fourth pluggable conductive bodies respectively.

In some embodiments, wherein the supporting bear comprises a base, and a supporting post extending from the center of the top surface of the base, and a sixth central hole axially extending through the supporting post and the base, the base is received in the receiving portion, the sixth central hole faces and communicates with the fifth central hole, the top surface of the base further recesses to define two holes, the holes are blind holes, the holes are arranged at opposite sides of the supporting post and correspond to the mounting holes respectively.

In some embodiments, the electronic cigarette further includes an atomizer device, wherein the atomizer device comprises a liquid-absorbing member with middle thereof being mounted in the receiving groove of the supporting post, a heating member mounted to the middle of the liquid-absorbing member, a sixth pluggable conductive member mounted to an end of the liquid-absorbing member and a seventh pluggable conductive member mounted to the other end of the liquid absorbing member, the sixth pluggable conductive member and the seventh pluggable conductive member are electrically connected to opposite ends of the heating member, and extend into the two mounting holes by passing through the holes respectively.

In the present invention, because the airflow channel is disposed within the switch body of the air switch, it is better to design the size of the airflow channel which extending through the air switch, at the same time, fixing mechanism for mounting the air switch, such as pad or welding points can be arranged out of the airflow channel, to protect the air sucked into the second airflow channel from being polluted, thereby protecting the consumers' health.

BRIEF DESCRIPTION OF THE DRAWINGS

In combination drawings with embodiments below to further illustrate the present invention, in the drawings.

DETAILED DESCRIPTION

In combination with drawings, illustrative embodiments of the disclosure are below. The following explanation provides specific details for a thorough understanding of and enabling description for these embodiments.

Figure 1:
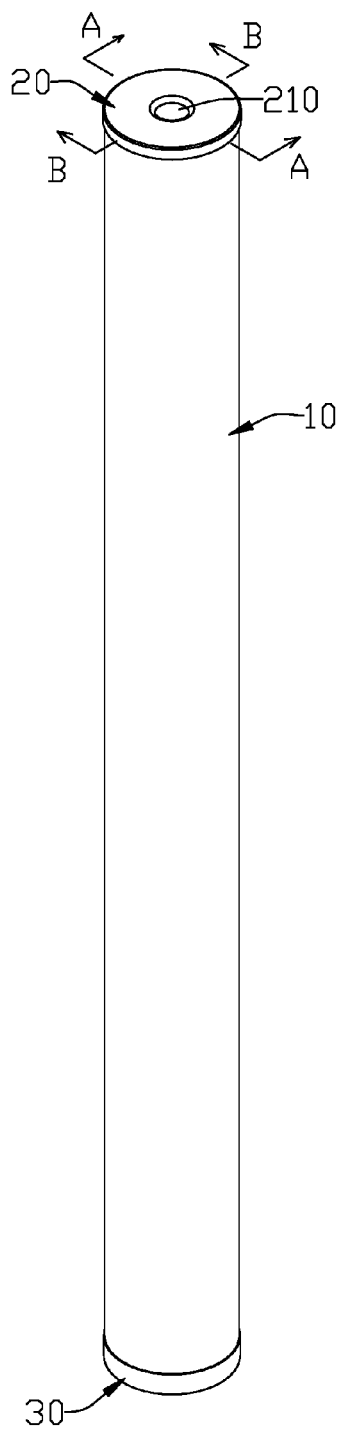
FIG. 1 is a perspective of the electronic cigarette in some embodiments; the electronic cigarette includes a mouthpiece, an end cover, an atomizer device, a reservoir, an atomizer device mounting base, a battery device, and an air switch.
Figure 2:
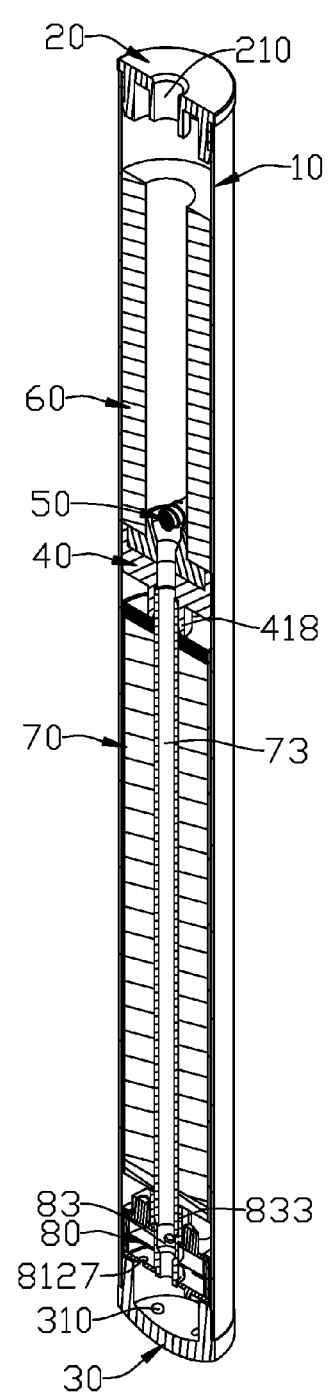
FIG. 2 is a cross-sectional view taken along line A-A of the electronic cigarette shown in FIG. 1.
Figure 3:
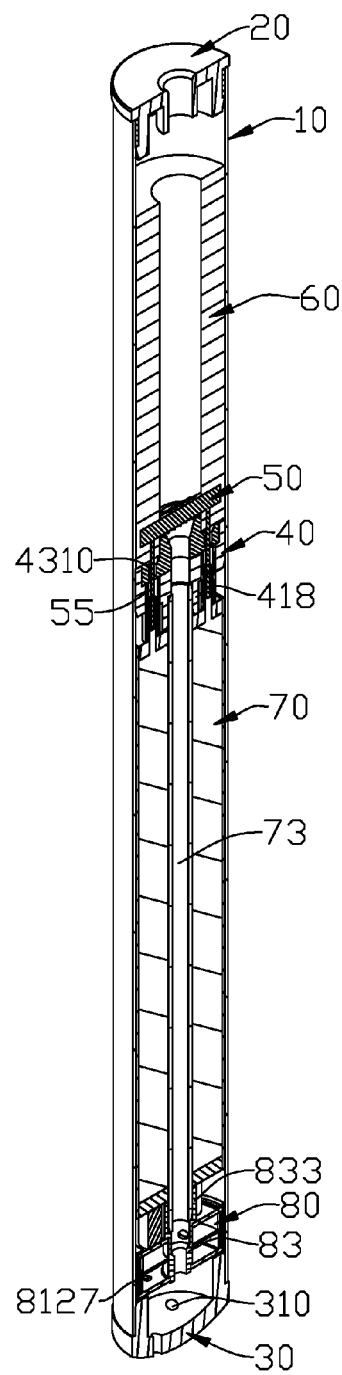
FIG. 3 is a cross-sectional view taken along line B-B of the electronic cigarette shown in FIG. 1.

FIGS. 1-3, illustrate an electronic cigarette 1 in some embodiments of the present invention. The electronic cigarette 1 may include a housing 10, a mouthpiece 20, an end cover 30, an atomizer device mounting base 40, an atomizer device 50, a reservoir 60, a battery device 70, and an air switch 80. The mouthpiece 20 and the end cover 30 cover opposite ends of the housing 10 respectively. The atomizer device mounting base 40, the atomizer device 50, the reservoir 60, the battery device 70 and the air switch 80 are disposed within the housing 10. The atomizer device mounting base 40 is arranged in the middle of the housing 10, and is used for supporting the atomizer device 50. The atomizer device 50 is mounted to the atomizer device mounting base 40 and is located between the atomizer device mounting base 40 and the mouthpiece 20, for atomizing liquid solution known as e-liquid. The reservoir 60 is mounted to the atomizer device mounting base 40 and wraps the atomizer device 50. The battery device 70 is arranged between the atomizer device mounting base 40 and the end cover 30, and is electrically connected to the atomizer device 50 for powering on the atomizer device 50. The air switch 80 is arranged between the battery device 70 and the end cover 30, and is electrically connected to the battery device 70. The air switch 80 is adapted to sense air flowing into the electronic cigarette 1 and to control the atomizer device 50 to be powered on/off.

The housing 10 in some embodiments may be substantially cylindrical. The housing 10 may be made of elastic material, such as elastic plastic, whereby enabling deformation when a predetermined force is radially applied to the housing 10 by the user, to simulate a touch sensation of a real cigarette. It is noteworthy that the housing 10 may be elliptic-cylindrical or tube-like. The housing 10 may also be made of rigid material, such as steel.

Figure 4:
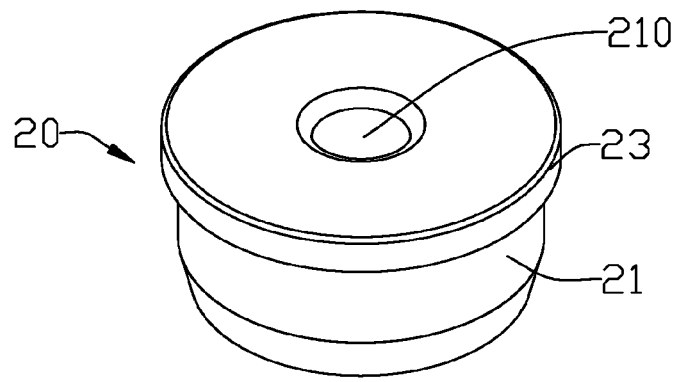
FIG. 4 is a perspective view of the mouthpiece of the electronic cigarette shown in FIG. 1.

Referring to FIG. 4, the mouthpiece 20 in some embodiments may be made of elastic material, such as silica gel. The mouthpiece 20 may include a cylindrical body 21 and an annular flange 23 connected to an end of the body 21. The cylindrical body 21 defines a first central through hole 210. The diameter of the body 21 is slightly greater than the diameter of a hole defined in corresponding end of the housing 10 for receiving the mouthpiece 20, whereby enabling the mouthpiece 20 to tightly engage within the housing 10 by an interference fit, for avoiding leakage of the liquid solution via the gap between the housing 10 and the mouthpiece 20. The flange 23 may protrude radially and outwardly from an outer end of the body 21. The outer diameter of the flange 23 is substantially equal to corresponding end of the housing 10 for receiving the mouthpiece 20, thereby enabling the flange 23 abutting against the end surface of the housing 10 when the mouthpiece 20 is inserted into the housing 10 (see FIG. 1). On one hand, the flange 23 is able to prevent the mouthpiece 20 from being inserted excessively into the housing 10; on the other hand, the flange 27 is able to allow the mouthpiece 20 to be easily pulled out.

Figure 5:
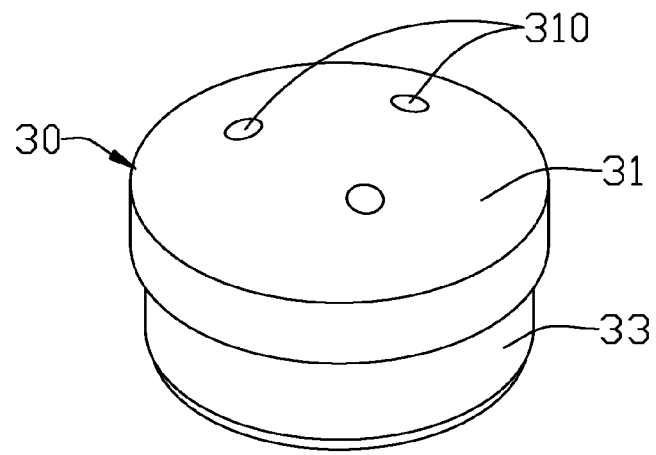
FIG. 5 is a perspective view of the end cover of the electronic cigarette shown in FIG. 1.

Referring to FIG. 5, in some embodiments, the end cover 30 may integrally formed by rigid plastic by injection molding. The end cover 30 may include a bottom wall 31 and a cylindrical sidewall 33 extending from the bottom wall 31. The bottom wall 31 is adapted to cover corresponding end of the housing 10, the sidewall 33 is tightly inserted into the housing 10, whereby the end cover 30 is mounted to corresponding end of the housing 10. The bottom wall 31 defines a plurality of through holes 310 for allowing air entering into the electronic cigarette 1. The bottom wall 31 may include a transparent portion, whereby enabling light emitted by the light emitting unit 90 transmitting therethrough.

Figure 6:
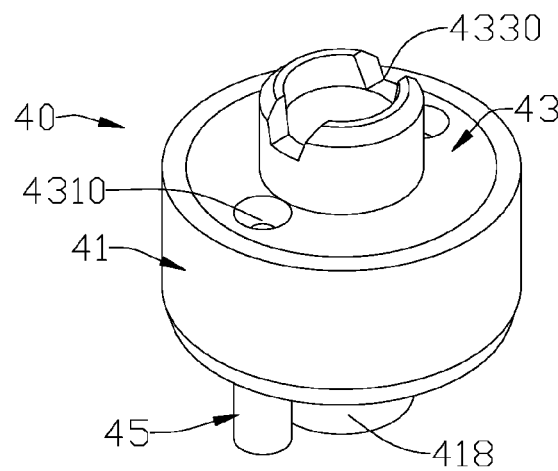
FIG. 6 is a perspective view of the atomizer device mounting base of the electronic cigarette shown in FIG. 1.
Figure 7:
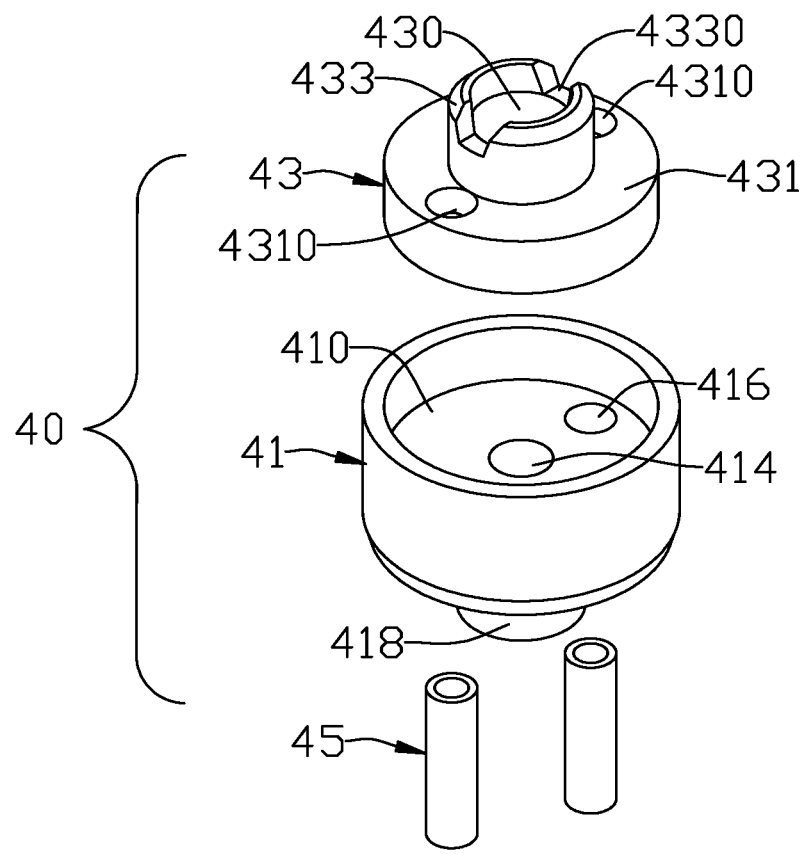
FIG. 7 is a disassembled view of the atomizer device mounting base shown in FIG. 6.
Figure 8:
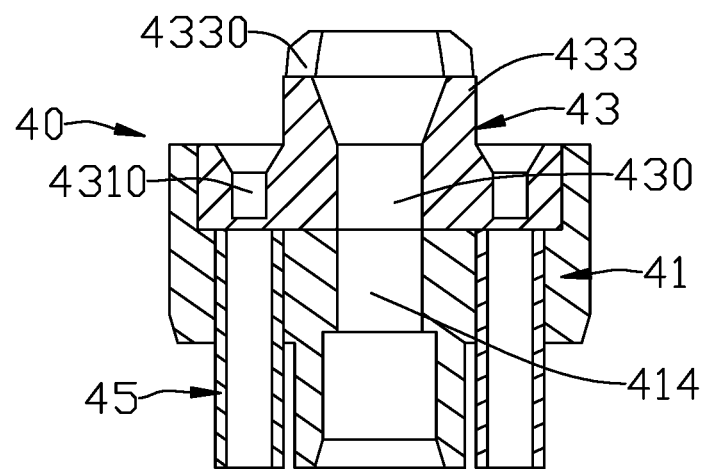
FIG. 8 is a cross-sectional view of the atomizer device mounting base shown in FIG. 6.

Referring to FIGS. 6 and 8, the atomizer device mounting base 40 in some embodiments may include a main body 41 engaging within the housing 10, a supporting bear 43 for mounting the atomizer device 50, and a pair of fourth pluggable conductive bodies 45 mounted to the bottom of the main body 41. The fourth pluggable conductive bodies 45 may be made of metal, such as, copper, or aluminum, and are adapted to be pluggable engagement with the first pluggable conductive member 72 and the second pluggable conductive member 74 of the battery device 70 respectively. In some embodiments, the fourth pluggable conductive bodies 45 are designed as jacks, and the first and second pluggable conductive members 72, 74 are designed as plugs, which are suitable for and inserted into the connecting bodies 45. It is noteworthy, in another some embodiments, the fourth pluggable conductive bodies 45 are designed to be plugs, and the first and second connecting members 72, 74 are designed to be jacks.

Figure 9:
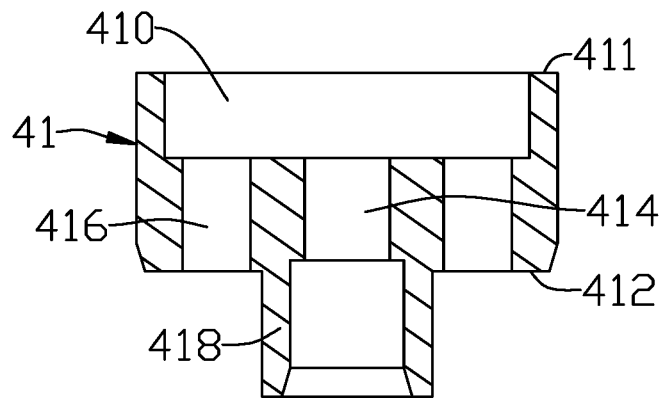
FIG. 9 is a cross-sectional view of the main body shown in FIG. 6.

Referring to FIG. 9, the main body 41 in some embodiments may be substantially cylindrical. The diameter of the main body 41 is suitable for the inner diameter of the housing 10, such that the main body 41 tightly engages with the inner sidewall of the housing 10. The main body 41 may be integrally formed from rigid plastic. The main body 41 may include a top end surface 411 and a bottom end surface 412 opposite to the top end surface 411. The center of the top end surface 411 recesses to define a receiving portion 410 for receiving the supporting bear 43. The receiving portion 410 may be substantially cylindrical. The main body 41 in some embodiments may further define a second central through hole 414 and two mounting holes 416. The mounting holes 416 are arranged at opposite sides of the second central through hole 414. The second central through hole 414 and the mounting holes 416 extend from the bottom of the receiving portion 410 to the bottom end surface 412. The second central through hole 414 is used for allowing air flow passing through. The mounting holes 416 are used for mounting the fourth pluggable conductive bodies 45 respectively. The main body 41 in some embodiments may further include a hollow sleeve 418. The hollow sleeve 418 is disposed vertically on the bottom end surface 412, and communicates with the second central through hole 414. The inner diameter of the sleeve 418 is suitable for the diameter of the first air flowing pipe 73 of the battery device 70, such that the sleeve 418 is able to sleeve on a top end of the first air flowing pipe 73, thereby enabling air in the battery device 70 entering into the main body 41.

Figure 10:
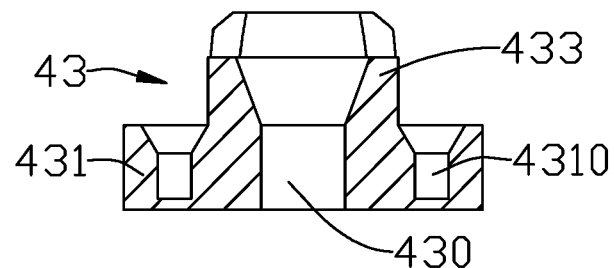
FIG. 10 is a cross-sectional view of the supporting bear shown in FIG. 6.

Referring to FIG. 10, the supporting bear 43 in some embodiments may be integrally formed from soft plastic. The supporting bear 41 may include a base 431, and a supporting post 433. The supporting post 433 perpendicularly extends from a central portion of the top surface of the base 431. The supporting bear 41 defines a central hole 430. The central hole 430 extends along the axis of the supporting bear 41, and extends through the base 431 and the supporting post 433. The base 431 in some embodiments may be flat-cylindrical, and the shape and the size of the base 431 are suitable for that of the receiving portion 410, such that the base 431 is able to be accommodated tightly within the receiving portion 410. The central hole 430 faces and communicates with the second central through hole 414, thereby enabling air in the main body 41 entering into the supporting bear 43.

The top surface of the base 431 further recesses to define two holes 4310, for allowing the sixth pluggable conductive member 55 and the seventh pluggable conductive member 57 of the atomizer device 50 extending through. Preferably, the holes 4310 are blind holes, and are arranged at opposite sides of the supporting post 433. The holes 4310 correspond to the mounting holes 416 respectively, thereby enabling the sixth pluggable conductive member 55 and the seventh pluggable conductive member 57 of the atomizer device 50 extending into the mounting holes 416 by passing through the mounting holes 416 respectively. The supporting post 433 is used for supporting the atomizer device 50. The end surface of the supporting post 433 recesses to define a receiving groove 4330 for receiving the atomizer device 50. The central hole 430 faces the second central through hole 414 of the main body 41, to allow air from the second central through hole 414 flowing into the atomizer device 50.

Figure 11:
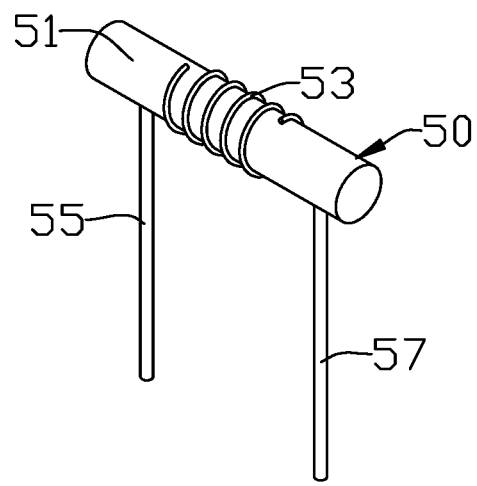
FIG. 11 is a perspective view of the atomizer device shown in FIG. 1.

Referring to FIG. 11, the atomizer device 50 in some embodiments may include a liquid-absorbing member 51, a heating member 53, a sixth pluggable conductive member 55 and a seventh pluggable conductive member 57. The liquid-absorbing member 51 is mounted to the receiving groove 4330 of the supporting post 433 of the atomizer device mounting base 40. The heating member 53 is mounted to the middle of the liquid-absorbing member 51. The sixth pluggable conductive member 55 and the seventh pluggable conductive member 57 are arranged to opposite ends of the liquid-absorbing member 51, and are electrically connected to opposite ends of the heating member 53. The liquid-absorbing member 51 in some embodiments may be cylindrical. The liquid-absorbing member 51 may be made of the fiber glass, and has a excellent capillarity performance. The heating member 53 in some embodiments may include metal wires, and coils on the middle portion of the liquid-absorbing member 51. The sixth pluggable conductive member 55 and the seventh pluggable conductive member 57 are connected to the bottom of the opposite ends of the liquid-absorbing member 51 respectively, and are electrically connected to the first pluggable conductive member 72 and the second pluggable conductive member 74 of the battery device 70.

Figure 12:
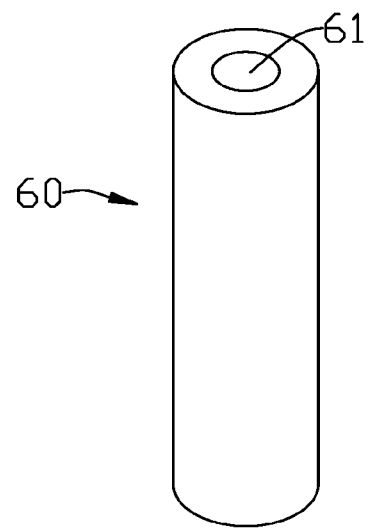
FIG. 12 is a perspective view of the reservoir shown in FIG. 1.

Referring to FIG. 12, the reservoir 60 in some embodiments may be substantially cylindrical, and is made from material having excellent liquid-absorbing performance, such as, cotton. The reservoir 60 defines an central hole 61, for air flowing therethrough. The outer diameter of the reservoir 60 is suitable for the inner diameter of the housing 10, such that the reservoir 60 is able to tightly inserted within the housing 10. The inner diameter of the reservoir 60 is suitable for the diameter of the supporting post 433 of the supporting bear 43, thereby enabling the reservoir 60 being tightly sleeved on the supporting post 433. Referring to FIG. 3 again, the reservoir 60 may further include an accommodating portion (not labeled). The accommodating portion allows opposite ends of the liquid-absorbing member 51 of the atomizer device 50 to extend through and further hold opposite ends of the liquid-absorbing member 51 firmly, thereby enabling the liquid solution in the reservoir 60 moving to the middle portion of the liquid-absorbing member 51 via opposite ends of the liquid-absorbing member 51. In some embodiments, the sixth pluggable conductive member 55 and the seventh pluggable conductive member 57 are embedded into the reservoir 60 and protrude out of the bottom surface of the reservoir 60.

Figure 13:
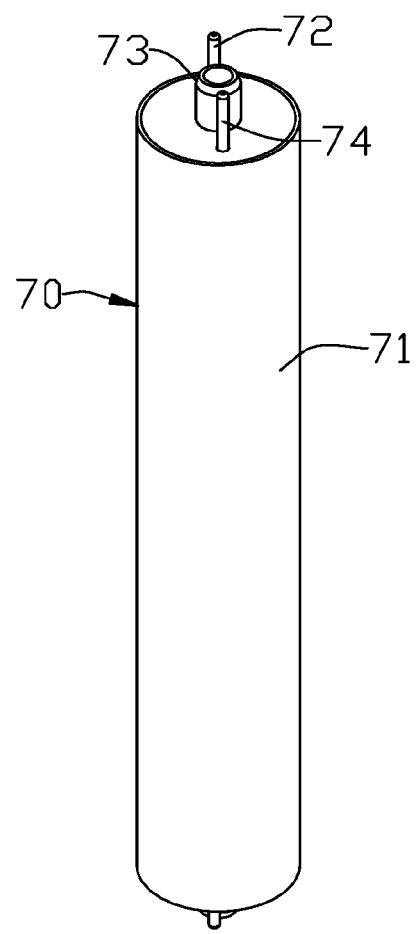
FIG. 13 is a perspective view of the battery device shown in FIG. 1.
Figure 14:
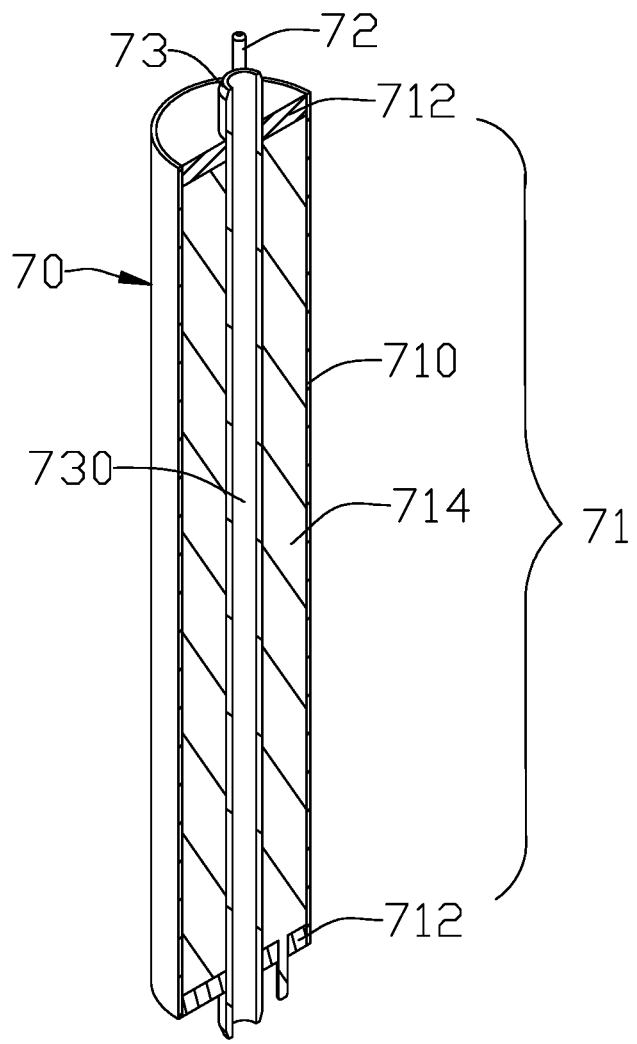
FIG. 14 is a cross sectional view of the battery device shown in FIG. 13 taken along the axis thereof.
Figure 15:
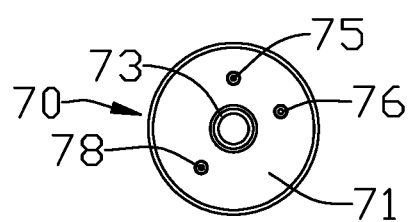
FIG. 15 is a perspective view of an end surface of the battery device shown in FIG. 13.

Referring to FIGS. 13 to 15, the battery device 70 in some embodiments may include a cylindrical body 71, and a first air flowing pipe 73 extending axially through the cylindrical body 71. The first air flowing pipe 73 defines a first airflow channel 730 for air passing through. The diameter of the cylindrical body 71 is suitable for the inner diameter of the housing 10, such that the cylindrical body 71 is able to be tightly inserted within the housing 10. An end of the first air flowing pipe 73 is coupled to the sleeve 418, the other end of the first air flowing pipe 73 is coupled to the air switch 80, thereby enabling air flowing from the air switch 80 to the atomizer device mounting base 40. In some embodiments, by virtue of the first air flowing pipe 73, air flow is able to pass through the battery device 70 via the first airflow channel 730, the diameter of the first airflow channel 730 is able to be controlled easily, and the consistence of the amount of the smoke generated by the electronic cigarette 1 is improved. As a result, the size of the air flowing channel at peripheral of battery device in related art being affected by lots of factors can be avoided, wherein the mentioned factors may include the shape of the battery device, the slanting condition of the battery device being in the related electronic cigarette, the configuration of wires at the surrounding of the battery device, and the like. Additionally, the mentioned factors may result in the amount of the smoke generated the same batch of electronic cigarette being different, namely, the manufactured electronic cigarettes is inconsistent. It is noteworthy that the first air flowing pipe 73 in some embodiment can be omitted, and the first airflow channel 730 is directly defined by the cylindrical body 71.

In some embodiments, the battery device 70 may further include a first pluggable conductive member 72 and a second pluggable conductive member 74. The first pluggable conductive member 72 and the second pluggable conductive member 74 face the atomizer device mounting base 40. The first pluggable conductive member 72 is electrically and directly connected to the anode of the battery device 70. In other word, the first pluggable conductive member 72 electrically contacts with the anode of the battery device 70 without the help of other objects. The second pluggable conductive member 74 is not directly connected to the cathode of the battery device 70. In other word, although the second pluggable conductive member 74 is mounted to the battery device 70, the second pluggable conductive member 74 is not electrically connected to the cathode of the battery device 70, namely, the second pluggable conductive member 74 keeps insulation from the cathode of the battery device 70. The first pluggable conductive member 72 and the second pluggable conductive member 74 are arranged at an end surface of the cylindrical body 71 opposite to the atomizer device mounting base 40 and are spaced apart from each other. The first pluggable conductive member 72 and the second pluggable conductive member 74 are inserted into the first pluggable conductive bodies 45 respectively, and further are electrically connected to the sixth pluggable conductive member 55 and the seventh pluggable conductive member 57 of the atomizer device 50.

Referring also to FIG. 15, in some embodiments, the battery device 70 further includes a third pluggable conductive member 75, a forth pluggable conductive member 76 and a fifth pluggable conductive member 78, all of them face the air switch 80. The third pluggable conductive member 75 is not electrically connected to the cathode of the battery device 70 directly, namely, the third pluggable conductive member 75 keeps insulation from the cathode of the battery device 70, but the third pluggable conductive member 75 is electrically connected to the second pluggable conductive member 74 directly. In some embodiments, the second pluggable conductive member 74 and the third pluggable conductive member 75 may be opposite end portions of an electric conductor, which extends through and keeps insulation from the cylindrical body 71. The forth pluggable conductive member 76 and the fifth pluggable conductive member 78 are electrically connected to the anode and the cathode of the battery device 70 directly, to supply power for the air switch 80. The third pluggable conductive member 75 is electrically connected to the air switch 80, and is further electrically connected to the fifth pluggable conductive member 78 by the air switch 80, thus, is electrically connected to the cathode of the battery device 70 indirectly.

It is noteworthy that, in some embodiments, the first pluggable conductive member 72 may is electrically connected to the cathode of the battery device 70 directly. The second pluggable conductive member 74 is not electrically connected to the anode of the battery device 70 directly. The third pluggable conductive member 75 is not electrically connected to the anode of the battery device 70, but is electrically connected to the second pluggable conductive member 74 directly. The third pluggable conductive member 75 is electrically connected to the air switch 80, and is further electrically connected to the forth pluggable conductive member 76 by the air switch 80, thereby enabling the third pluggable conductive member 75 is electrically connected to the anode of the battery device 70 indirectly.

The battery device 70 in some embodiments may be a lithium battery. The cylindrical 71 in some embodiments may include a shell 710, two end caps 712 and a battery material 714. The battery material 714 is formed by multi-layer films wrapping together. The multilayer films may include a positive film, a negative film, and an insulation film. The battery device 70 may be manufactured by executing following steps: firstly, wrapping the multilayer films on the first air flowing pipe 73 for some coils; secondly, placing a conductor coiled with insulation therein, and then continue to wrap the rest multilayer films; then, inserting the battery material 714 into the shell 710, and coupling the end caps 712 to opposite ends of the shell 710 respectively. Finally, letting the two ends of the electric conductor protruding from the end caps 712 respectively, so as to form the second pluggable conductive member 74 and the third pluggable conductive member 75 respectively.

Figure 16:
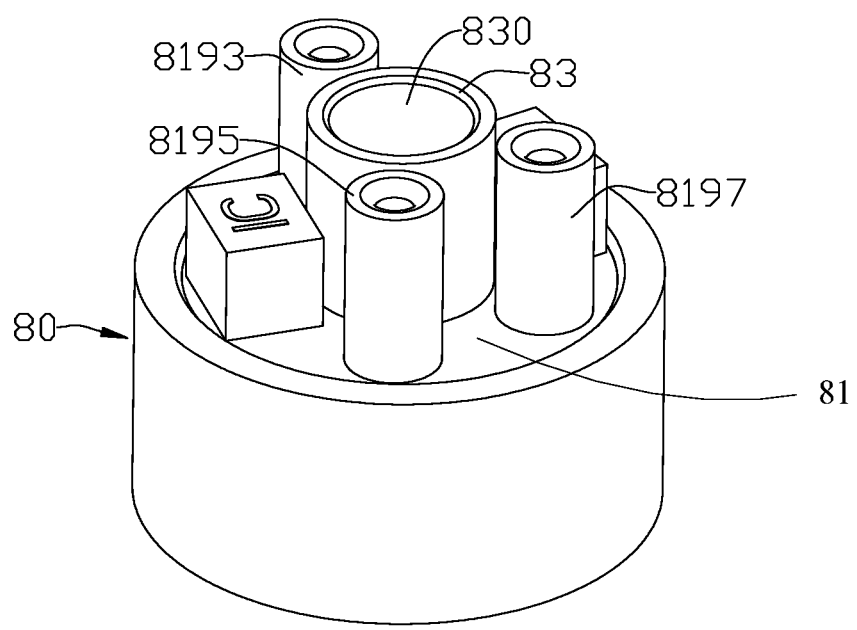
FIG. 16 is a perspective view of the air switch shown in FIG. 1.
Figure 17:
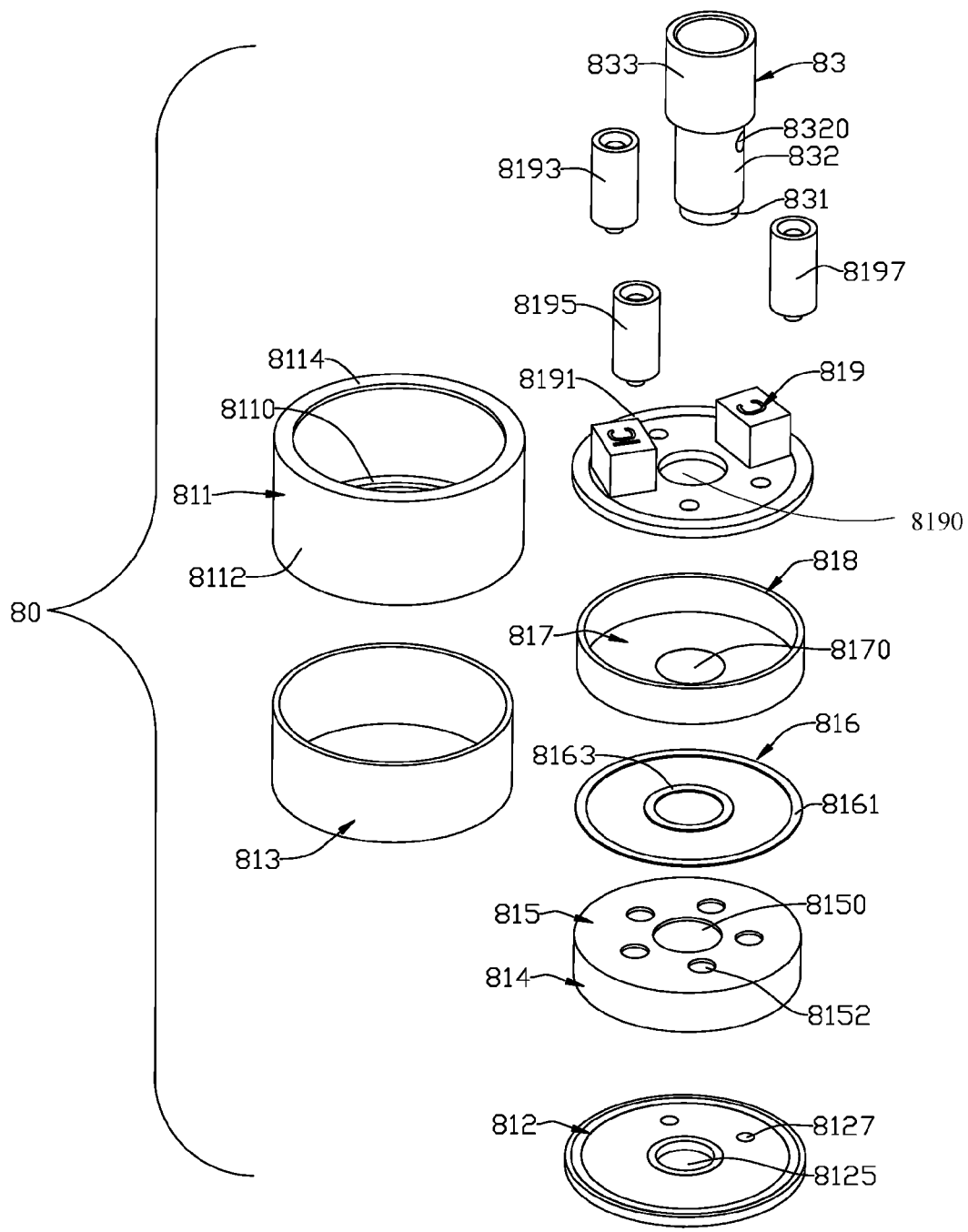
FIG. 17 is a disassembled view of the air switch shown in FIG. 16.
Figure 18:
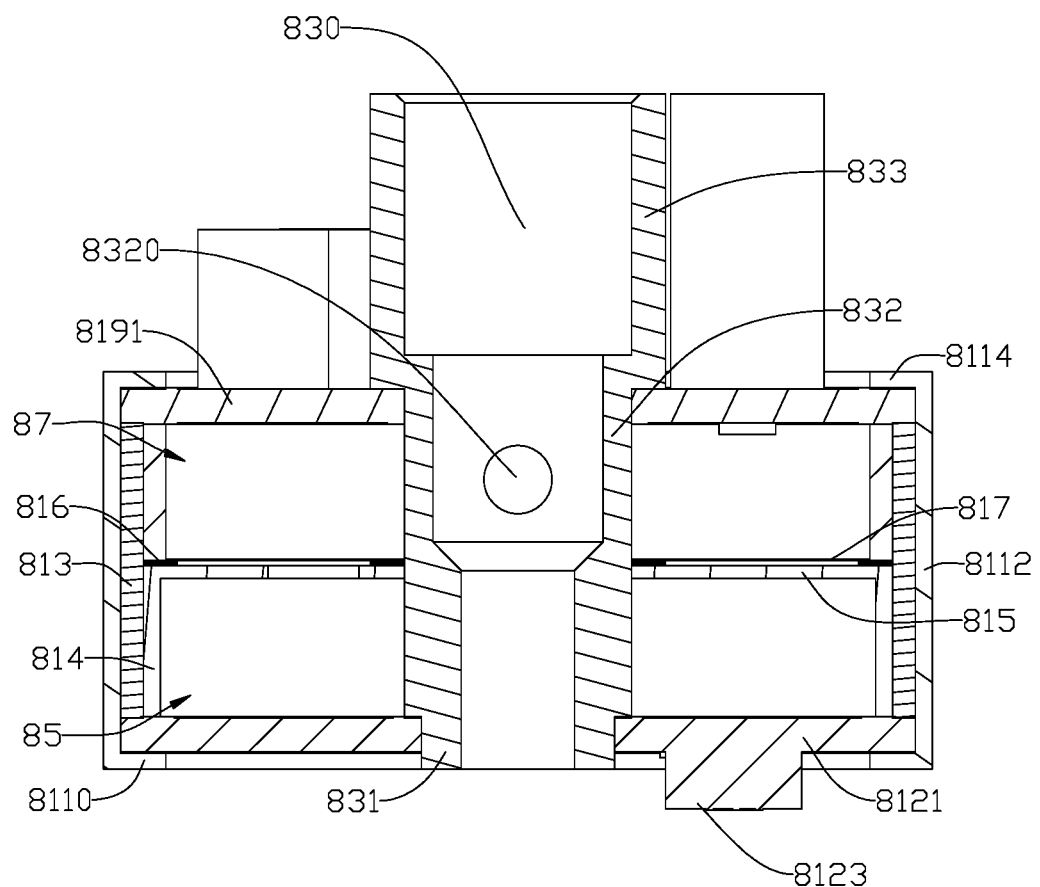
FIG. 18 is a cross-sectional view of the air switch shown in FIG. 16 taken along the axis.

Referring to FIGS. 16 to 18, the air switch 80 in some embodiments may include a switch body 81 and a second air flowing pipe 83 extending through the switch body 81. The switch body 81 defines a second airflow channel 830 extending axially through the switch body 81. In some embodiments, the switch body 81 is substantially flat-cylindrical. The diameter of the switch body 81 is suitable for the inner diameter of the housing 10, thereby the switch body 81 is able to be tightly inserted within the housing 10. As the second airflow channel 830 is configured to extend through the switch body 81, the second airflow channel 830 is not limited by the housing 10, thus, the size of the second airflow channel 830 can be designed to be various according to requirements, to meet various electronic cigarette 1's request for different air flow. Furthermore, when the air switch 80 is applied to the electronic cigarette 1, fixing mechanism for mounting the air switch 80, such as pad or welding points can be arranged out of the second airflow channel 830, to protect the air sucked into the second airflow channel 830 from being polluted, thereby protecting the users' health. It is noteworthy that, in some embodiments, the second air flowing pipe 83 can be omitted, and the second airflow channel 830 is directly defined by the switch body 81.

The switch body 81 in some embodiments may include a case 811, an insulator 813, a light emitting device 812, a first conductive bracket 814, a first electrode plate 815, an insulating gasket 816, a second conductive bracket 818, a second electrode plate 817, and a controlling device 819. The insulator 813, the light emitting device 812, the conductive bracket 814, the first electrode plate 815, the insulating gasket 816, the second conductive bracket 818, the second electrode plate 817, and the controlling device 819 are housed in the case 811. The insulator 813 is used for insulating the first and second conductive brackets 814, 818 from the case 811. The light emitting device 812 is used for simulating burning effect of real cigarette. The first conductive bracket 814 is adapted to support the first electrode plate 817, and electrically connect the first electrode plate 815 with the light emitting device 812. The second conductive bracket 818 is adapted to support the second electrode plate 817, and electrically connect the second electrode plate 817 with the controlling device 819. The controlling device 819 is adapted to control the battery device 70 to power on/off the atomizer device 50 and the light emitting device 812.

Referring also to FIGS. 17 and 18, the case 811 in some embodiments may be substantially cylindrical, and be made of conductive material, such as metal, such that the case 811 is electrically conductive. The case 811 may include an annular bottom wall 8110, a cylindrical sidewall 8112 protruding from an outer edge of the bottom wall 8110, and a top wall 8114 fixed to a top end of the cylindrical sidewall 8112 away from the bottom wall 8110. The outer diameter of the cylindrical sidewall 8112 is suitable for the inner diameter of the housing 10. It should be understood that, to make the case 811 having conductive function, the case 811 is not limited to be made of conductive material, such as metal, the case 811 can be made of insulation material with conductive material being embedded therein.

The light emitting device 812 in some embodiments may include a driving circuit board 8121, and a light emitting member 8123 fixed to a bottom surface of the driving circuit board 8121. The light emitting member 8123 may include a lighting emitting diode (LED). The driving circuit board 8121 in some embodiments may further include a first central hole 8125 for allowing the second air flowing pipe 83 extending therethrough, and a plurality of first apertures 8127 arranged at a side of the first central hole 8125. The diameter of the driving circuit board 8121 is suitable for the inner diameter of the cylindrical sidewall 8112, thereby enabling the driving circuit board 8121 tightly engaging with the cylindrical sidewall 8112.The driving circuit board 8121 in some embodiments is arranged at the top surface of the bottom wall 8110 of the case 811, and is electrically connected to the bottom wall 8110, such that the cathode of the battery device 70 is electrically connected to the light emitting device 812 via the controlling device 819 and the case 811.

The insulator 813 in some embodiments may be substantially cylindrical. The outer diameter of the insulator 813 is suitable for the inner diameter of the case 811, thereby enabling the insulator 813 tightly engaging with the cylindrical sidewall 8112. The insulator 813 is mounted to the top surface of the driving circuit board 8121 of the light emitting device 812. The top surface of the insulator 813 is spaced apart from the bottom surface of the top wall 8114 of the case 811 to form a gap for receiving the controlling device 819.

The first conductive bracket 814 in some embodiments may be substantially cylindrical. The first conductive bracket 814 is disposed within the insulator 813, and is arranged upon the top surface of the driving circuit board 8121 of the light emitting device 812. The first conductive bracket 814 is electrically connected to the driving circuit board 8121. The outer diameter of the first conductive bracket 814 is suitable for the inner diameter of the insulator 813, thereby enabling the first conductive bracket 814 be tightly accommodated within the insulator 813.

The first electrode plate 815 in some embodiments may be substantially ring-shaped. The first electrode plate 815 is electrically connected to the top end surface of the first conductive bracket 814, such that the first electrode plate 815 is able to be electrically connected to the anode of the battery device 70 by the first conductive bracket 814, the driving circuit board 8121, the case 811 and the controlling device 819 in sequence. The first electrode plate 815 has a second central hole 8150 for allowing the air flowing pipe 83 extending through, and a plurality of second apertures 8152 for ventilation. The second apertures 8152 are spaced apart from each other and equidistantly surround the second central hole 8150. In some embodiments, both the first electrode plate 815 and the second conductive bracket 814 are made of metal, and the first electrode plate 815 and the conductive bracket 814 can be individual, or be integrally formed.

The insulating gasket 816 in some embodiments may include an outer gasket unit 8161 and an inner gasket unit 8163. The outer gasket unit 8161 is mounted to an outer periphery of the first electrode plate 815, and the inner gasket unit 8163 are mounted to an inner periphery of the first electrode plate 815.

The second electrode plate 817 in some embodiments may be an annular conductive film. The second electrode plate 817 defines a third central hole 8170 for allowing the air flowing pipe 83 extending through. The second electrode plate 817 is mounted on the insulating gasket 816. The outer periphery and the inner periphery of the second electrode plate 817 are supported by the outer gasket unit 8161 and the inner gasket unit 8163 respectively, and thus, the second electrode plate 817 is insulated from the first electrode plate 815, whereby the first electrode plate 815 and the second electrode plate 817 cooperatively form a parallel-plate capacitor. Thus, when the second electrode plate 815 vibrates, the distance between the first electrode plate 815 and the second electrode plate 817 changes, such that the voltage is able to be changed.

The second conductive bracket 818 in some embodiments is substantially cylindrical. The lower end of the second conductive bracket 814 is disposed upon the second electrode plate 817, and is electrically connected to the second electrode plate 817, whereby enabling the second electrode plate 817 being electrically connected to the anode of the battery device 70 through the second conductive bracket 818 and the controlling device 819 in sequence. The outer diameter of the second conductive bracket 818 is substantially equal to the inner diameter of the insulator 813, thereby enabling the second conductive bracket 818 being tightly accommodated within the insulator 813.

The controlling device 819 in some embodiments may include a controlling circuit board 8191, a first pluggable conductive body 8193, a second pluggable conductive body 8195 and a third pluggable conductive body 8197. The first connecting body 8193, the conductive second connecting body 8195 and the third pluggable conductive body 8197 are mounted upon a top surface of the controlling circuit board 8191. The first pluggable conductive body 8193, the second pluggable conductive body 8195 and the third pluggable conductive body 8197 are engaged with the third pluggable conductive member 75, the forth pluggable conductive member 76, and the fifth pluggable conductive member 78 of the battery device 70 respectively. Wherein, the second pluggable conductive body 8195 and the third pluggable conductive body 8197 are engaged with the third pluggable conductive member 75 and the forth pluggable conductive member 76 respectively, to electrically connect the controlling circuit board 8191 to the anode and the cathode of the battery device 70. The first pluggable conductive body 8193 engages with the third pluggable conductive member 75 of the battery device 70, to electrically connect the third pluggable conductive member 75 to the cathode of the battery device 70 via the controlling circuit board 8191. In detail, the first pluggable conductive body 8193 in the controlling circuit board 8191 is electrically connected to the third pluggable conductive body 8197 via an electronic switch, such as transistor or thyristor, such that the atomizer device 50 is powered on/off by controlling the controlling circuit board 8191.

The controlling circuit board 8191 in some embodiments may be substantially ring-shaped, and has a fourth central hole 8190 for allowing the air flowing pipe 83 extending through. The controlling circuit board 8191 is disposed within the gap defined by the top wall 8114 and the top end surface of the second conductive bracket 818 and the insulator 813, and is electrically connected to the top wall 8114 and the second conductive bracket 818, thereby enabling the controlling circuit board 8191 being electrically connected to the driving circuit board 8121 and the second electrode plate 817. The outer diameter of the controlling circuit board 8191 is suitable for the inner diameter of the case 811, such that the controlling circuit board 8191 is able to be tightly engaged with the side wall of the case 811.

The second air flowing pipe 83 in some embodiments is inserted within the central hole 8125 of the driving circuit board 8121, the second central hole 8150 of the first electrode plate 815, the inner gasket unit 8163, the third central hole 8170 of the second electrode plate 817 and the fourth central hole 8190 of the controlling circuit board 8191 in sequence, and electrically connect the inner periphery of the controlling circuit board 8191 with the inner periphery of the driving circuit board 8121.

The second air flowing pipe 83 in some embodiments may be substantially step-cylindrical, and is made of electrically conductive material. The second air flowing pipe 83 includes a first pipe 831, a second pipe 832, and a third pipe 833. The out diameter of the second pipe 832 is greater than that of the first pipe 831, and the out diameter of the third pipe 833 is greater than that of the second pipe 832. Wherein the outer diameter of the first pipe 831 is suitable for the diameter of the first central hole 8125, the outer diameter of the second pipe 832 is suitable for the diameter of the second central hole 8150 of the first electrode plate 815, the diameter of the inner gasket unit 8163, the diameter of the third central hole 8170 of the second electrode plate 817, and the diameter of the fourth central hole 8190 of the controlling circuit board 819 respectively. Thus, when the second air flowing pipe 83 is inserted into the switch body 81, a step between the first pipe 831 and the second pipe 833 abuts against and is electrically connected to the top surface of the driving circuit board 8121, and a step between the second pipe 832 and the third pipe 832 abuts against and is electrically connected to the top surface of the controlling circuit board 8191, thereby enabling the anode of the battery device 70 being electrically connected to the light emitting device 812 via the controlling device 819 and the second air flowing pipe 83 in sequence. In some embodiments, the second pipe 832 defines an extending hole 8320. The inner space of the second pipe 832 communicates with the outside via the extending hole 8320. The inner diameter of the third pipe 833 is suitable for the outer diameter of the bottom end of the first air flowing pipe 73, such that the third pipe 833 can be sleeved on a bottom end of the first air flowing pipe 73 of the battery device 70, and air in the second air flowing pipe 83 can flow into the first air flowing pipe 73.

Figure 19:
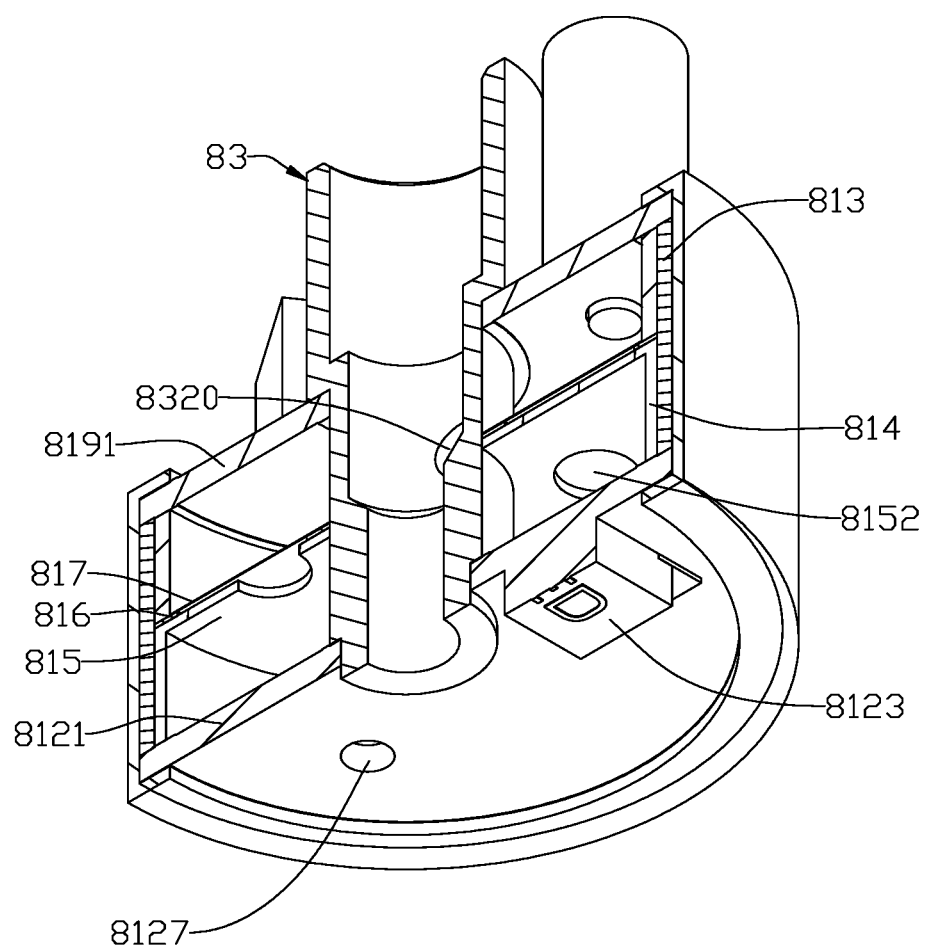
FIG. 19 is a perspective cross-sectional view of the air switch shown in FIG. 18.

Referring also to FIGS. 18 and 19, the second electrode plate 817, the first conductive bracket 814, the driving circuit board 8121, the first gasket 8161 and the second air flowing pipe 83 cooperatively define a balance chamber 85. The balance chamber 85 is substantially annular. The first electrode plate 815 is accommodated within the balance chamber 85. The balance chamber 85 communicates with the outside of the air switch 80 via the first apertures 8127 defined in the driving circuit board 8121, to keep air pressure in the balance chamber 85 consistent with that of the outside of the air switch 80.

The second electrode plate 817, the second conductive bracket 818, the controlling circuit board 8191 and the second air flowing pipe 83 cooperatively define an annular negative chamber 87. The negative chamber 87 communicates with the inner space of the second air flowing pipe 83 via the extending hole 8320. Thus, when air flows through the second air flowing pipe 83 quickly, a negative pressure is formed in the negative chamber 87. At this time, a side of the second electrode plate 817 forms a negative pressure, and the other side of the electrode plate 817 keeps in balance with the outside pressure of the air switch 80. Thus, the second electrode plate 817 is elastically deformed toward the first electrode plate 815, and the capacitance of the a parallel-plate capacitor being composed of the first and second electrode plates 815, 817 is changed. Thereby providing a controlling signal to the control IC of the controlling circuit board 8191. Accordingly, the control IC controls the electronic switch (such as transistor) of the controlling circuit board 8191 to connect the atomizer device 50 and the light emitting device 812 to the battery device 70. As a result, the balance chamber 85, the negative chamber 87, the first electrode plate 815 and the second electrode plate 817 cooperatively form an airflow sensor for the switch body 81.

The electronic cigarette 1 described above may be manufactured by executing flowing steps:

(1) The atomizer device 50 is mounted into the receiving groove 4330 of the supporting post of the atomizer device mounting base 40, with the sixth pluggable conductive member 55 and the seventh pluggable conductive member 57 being inserted into the two holes 4310 respectively, and further being electrically connected to the two fourth pluggable conductive bodies 45 of the atomizer device mounting base 40 respectively;

(2) The sleeve 418 of the atomizer device mounting base 40 sleeves the top end of the first air flowing pipe 73 of the battery device 70, and the two fourth conductive connecting bodies 45 of the atomizer device mounting base 40 sleeve the first pluggable conductive member 72 and the second pluggable conductive member 74 respectively;

(3) The third pipe 833 of the second air flowing pipe 83 of the air switch 80 sleeves the bottom end of the first air flowing pipe 73 of the battery device 70, and the third pluggable conductive member 75, the fourth pluggable conductive member 76, and the fifth pluggable conductive member 78 are inserted into the first pluggable conductive body 8193, the second pluggable conductive body 8195 and the third pluggable conductive body 8197 of the air switch 80 respectively;

(4) The two fourth pluggable conductive bodies 45 are flatted, thereby enabling the sixth pluggable conductive member 55 and the seventh pluggable conductive member 57 tightly engaging with the first pluggable conductive member 72 and the second pluggable conductive member 74 respectively;

(5) The atomizer device 50, the atomizer device mounting base 40, the battery device 70 and the air switch 80 are disposed within the housing 10;

(6) The mouthpiece 20 and the end cover 30 cover opposite ends of the housing 10.

In use, when the user inhales the electronic cigarette 1 at the mouthpiece 20, air firstly enters into the housing 10 via the through hole 310, then reaches the atomizer device 50 by passing through the second air flowing pipe 83 of the air switch 80, the first air flowing pipe 73 of the battery device 70 in sequence. When air flows into the air switch 80, the air switch 80 senses airflow, and provides a control signal to the controlling circuit board 8191. The controlling circuit board 8191 controls the battery device 70 to powering on the atomizer device 50 and the light emitting device 812. At this time, the heating member 53 of atomizer device 50 is heating to atomize solution to generate smoke, the generated smoke together with air pass through the central hole 61 of the reservoir 60, and further flow out of the electronic cigarette 1 via the first central through hole 210, and the light emitting device 812 emits light.

It should be noteworthy that, the pluggable conductive bodies and pluggable conductive members in above embodiments are provided for allowing components being pluggable engagement with each other conveniently. In some embodiments, when there is no demand for pluggable engagement, various conductive members can be used to replace the pluggable conductive bodies and pluggable conductive members.

It should be pointed out that, for an ordinary person skilled in the art, many modifications and variations could be made without departing from the scope and spirit of the claims as appended. For the scope of the present invention, the disclosure of the present invention is illustrative but not restrictive, and the scope of the present invention is defined by the appended claims.

What is claimed is:

1. An air switch of an electronic cigarette, comprising a switch body and an airflow channel extending through the switch body; wherein the switch body comprises an airflow sensor for sensing air passing through the airflow channel and a controlling device electrically connected to the airflow switch;

the airflow sensor comprises a negative chamber communicating with the airflow channel, a balance chamber communicating with the outside of the air switch, a first electrode plate and a second electrode plate parallel to and being spaced apart from the first electrode plate; the second electrode plate comprises a conductive film, the conductive film is arranged between the negative chamber and the balance chamber, and cooperates with the first electrode plate to form a parallel-plate capacitor to sense a difference in the pressure between the negative chamber and the balance chamber; the parallel-plate capacitor is electrically connected to the controlling device, to transmit the difference signal to the controlling device;

the switch body comprises a first air flowing pipe, a conductive case, a light emitting device, a first conductive bracket, an insulating gasket, and a second conductive bracket; the first air flowing pipe defines the airflow channel; wherein the case comprises an annular bottom wall, a cylindrical sidewall protruding from an outer edge of the bottom wall, and a top wall fixed to a top end of the cylindrical sidewall away from the bottom wall; wherein the light emitting device comprises a driving circuit board, and a light emitting member fixed to a bottom surface of the driving circuit board; the driving circuit board defines a first central hole for allowing the second air flowing pipe extending through, and a plurality of first apertures arranged at a side of the first central hole; the driving circuit board is mounted on a top surface of the bottom wall and is electrically connected to the bottom wall; wherein the first conductive bracket is arranged on the top surface of the driving circuit board and is electrically connected to the driving circuit board; the first electrode plate is electrically connected to a top end of the first conductive bracket, the first electrode plate defines a second central hole for allowing the air flowing pipe extending through, and a plurality of second apertures; the second aperture are arranged surrounding the second central hole; the conductive film defines a third central hole for allowing the air flowing pipe extending through, the conductive film is mounted on the insulating gasket and is insulated from the first electrode plate, to cooperate with the second electrode plate to form a parallel-plate capacitor; the second conductive bracket is mounted on and electrically connected to the conductive film; wherein the controlling device comprises a controlling circuit board, the controlling circuit board define a fourth central hole for allowing the first air flowing pipe extending through, the controlling circuit board is disposed in the gap defined by the top wall of the case and the top end surface of the second conductive bracket, and is electrically connected to the top wall and the second conductive bracket; wherein the first air flowing pipe extends through the first central hole, the second central hole, the third central hole and the fourth central hole, and further electrically connect an inner wall of the controlling circuit board with the inner wall of the driving circuit board; wherein the conductive film, the first conductive bracket, the driving circuit board, the insulating gasket and the second air flowing pipe cooperatively define the balance chamber; the conductive film, the second conductive bracket, the controlling circuit board and the first air flowing pipe cooperatively define the annular negative chamber.

2. The air switch as described in claim 1, wherein the first air flowing pipe comprises a first pipe, a second pipe, and a third pipe, the out diameter of the second pipe is greater than that of the first pipe, and the out diameter of the third pipe is greater than that of the second pipe; the outer diameter of the first pipe is suitable for the diameter of the first central hole, the outer diameter of the second pipe is suitable for the diameter of the second central hole of the first electrode plate, the diameter of the inner gasket unit, the diameter of the third central hole of the second electrode plate, the diameter of the fourth central hole of the controlling circuit board respectively; a step between the first pipe and the second pipe abuts against and is electrically connected to the top surface of the driving circuit board, and a step between the second pipe and the third pipe abuts against and is electrically connected to the top surface of the controlling circuit board; the second pipe defines an extending hole for communicating the inner space of the second pipe with the negative chamber.

3. The air switch as described in claim 1, wherein the controlling device comprises a first pluggable conductive body, a second pluggable conductive body and a third pluggable conductive body, which are arranged on a top surface of the controlling circuit board; the second pluggable conductive body is electrically connected to one of a cathode and an anode of the battery device, and the third pluggable conductive body is electrically connected to the other of the cathode and anode of the battery device; the first pluggable conductive body is electrically connected to the third pluggable conductive member via the controlling circuit board.

4. The air switch as described in claim 1, wherein the switch body further comprises an insulator, the insulator is substantially ring shaped, and is arranged between the first and second conductive brackets and the cylindrical sidewall of the case.

5. The air switch as described in claim 1, wherein the insulating gasket comprises an outer gasket unit and an inner gasket unit; the outer gasket unit and the inner gasket unit are mounted to the outer wall and inner wall of the first electrode plate respectively; the outer wall and the inner wall of the conductive film are supported by the outer gasket unit and the inner gasket unit respectively.

6. An electronic cigarette, comprising an air switch, wherein the air switch comprises a switch body and an airflow channel extending through the switch body;

the switch body comprises an airflow sensor for sensing air passing through the airflow channel and a controlling device electrically connected to the airflow switch;

the airflow sensor comprises a negative chamber communicating with the airflow channel, a balance chamber communicating with the outside of the air switch, a first electrode plate and a second electrode plate parallel to and being spaced apart from the first electrode plate; the second electrode plate comprises a conductive film, the conductive film is arranged between the negative chamber and the balance chamber, and cooperates with the first electrode plate to form a parallel-plate capacitor to detect a difference in the pressure between the negative chamber and the balance chamber; the parallel-plate capacitor is electrically connected to the controlling device, to transmit the difference signal to the controlling device;

the switch body comprises a first air flowing pipe, a conductive case, a light emitting device, a first conductive bracket, an insulating gasket, and a second conductive bracket; the first air flowing pipe defines the airflow channel; the case comprises an annular bottom wall, a cylindrical sidewall protruding from an outer edge of the bottom wall, and a top wall fixed to a top end of the cylindrical sidewall away from the bottom wall; wherein the light emitting device comprises a driving circuit board, and a light emitting member fixed to a bottom surface of the driving circuit board; the driving circuit board defines a first central hole for allowing the second air flowing pipe extending through, and a plurality of first apertures arranged at a side of the first central hole; the driving circuit board is mounted on a top surface of the bottom wall and is electrically connected to the bottom wall; wherein the first conductive bracket is arranged on the top surface of the driving circuit board and is electrically connected to the driving circuit board; the first electrode plate is electrically connected to a top end of the first conductive bracket, the first electrode plate defines a second central hole for allowing the air flowing pipe extending through, and a plurality of second apertures; the second aperture are arranged surrounding the second central hole; the conductive film defines a third central hole for allowing the air flowing pipe extending through, the conductive film is mounted on the insulating gasket and is insulated from the first electrode plate, to cooperate with the second electrode plate to form a parallel-plate capacitor; the second conductive bracket is mounted on and electrically connected to the conductive film; wherein the controlling device comprises a controlling circuit board, the controlling circuit board define a fourth central hole for allowing the first air flowing pipe extending through, the controlling circuit board is disposed in the clearance between the top wall of the case and the top end surface of the second conductive bracket, and is electrically connected to the top wall and the second conductive bracket; wherein the first air flowing pipe extends through the first central hole, the second central hole, the third central hole and the fourth central hole, and further electrically connect an inner wall of the controlling circuit board with the inner wall of the driving circuit board; wherein the conductive film, the first conductive bracket, the driving circuit board, the insulating gasket and the second air flowing pipe cooperatively define the balance chamber; the conductive film, the second conductive bracket, the controlling circuit board and the first air flowing pipe cooperatively define the annular negative chamber.

7. The electronic cigarette as described in claim 6, further comprising a battery device; wherein the battery device comprises a cylindrical body and a second air flowing pipe extending axially through the cylindrical body, the second air flowing pipe is connected to an end of the first air flowing pipe.

8. The electronic cigarette as described in claim 7, further comprising an atomizer device mounting base; wherein the atomizer device mounting base communicates with an end of the second air flowing pipe away from the first air flowing pipe; the battery device further comprises comprising a first pluggable conductive member, a second pluggable conductive member, a third pluggable conductive member, a fourth pluggable conductive member, and a fifth pluggable conductive member, the first and second pluggable conductive members face the atomizer device mounting base, the third pluggable conductive member, the fourth pluggable conductive member, and the fifth pluggable conductive member face the air switch; the first pluggable conductive member is electrically connected to one of an anode and a cathode of the battery device directly, the second pluggable conductive member is electrically connected to the third pluggable conductive member directly; the third pluggable conductive member, the fourth pluggable conductive member, and the fifth pluggable conductive member engage with the first pluggable conductive body, the second pluggable conductive body, and the third pluggable conductive body respectively, the third pluggable conductive body is electrically connected to the other one of the anode and cathode of the battery device.

9. The electronic cigarette as described in claim 8, wherein the atomizer device mounting base comprises a main body, a supporting bear for mounting the atomizer device, and two fourth pluggable conductive bodies mounted to the bottom of the main body, the fourth pluggable conductive bodies engage with the first pluggable conductive member and the second pluggable conductive member respectively.

10. The electronic cigarette as described in claim 9, wherein the main body comprises a top end surface and a bottom end surface opposite to the top end surface; the center of the top end surface recesses to form a receiving portion for receiving the supporting bear, the main body further defines a fifth central hole and two mounting holes arranged at opposite sides of the fifth central hole, the second central hole and the mounting holes extend from the bottom of the receiving portion to the bottom end surface, the second central hole is used for allowing air circulation, the mounting holes are used for mounting the fourth pluggable conductive bodies respectively.

11. The electronic cigarette as described in claim 10, wherein the supporting bear comprises a base, and a supporting post extending from the center of the top surface of the base, and a sixth central hole axially extending through the supporting post and the base, the base is received in the receiving portion, the sixth central hole faces and communicates with the fifth central hole, the top surface of the base further recesses to define two holes, the holes are blind holes, the holes are arranged at opposite sides of the supporting post and correspond to the mounting holes respectively.

12. The electronic cigarette as described in claim 11, further comprising an atomizer device, wherein the atomizer device comprises a liquid-absorbing member with middle thereof being mounted in the receiving groove of the supporting post, a heating member mounted to the middle of the liquid-absorbing member, a sixth pluggable conductive member mounted to an end of the liquid-absorbing member and a seventh pluggable conductive member mounted to the other end of the liquid absorbing member, the sixth pluggable conductive member and the seventh pluggable conductive member are electrically connected to opposite ends of the heating member, and extend into the two mounting holes by passing through the holes respectively.

13. The electronic cigarette as described in claim 6, wherein the first air flowing pipe comprises a first pipe with the out diameter thereof increasing gradually, a second pipe, and a third pipe, the outer diameter of the first pipe is suitable for the diameter of the first central hole, the outer diameter of the second pipe is suitable for the diameter of the second central hole of the first electrode plate, the diameter of the inner gasket unit, the diameter of the third central hole of the second electrode plate, the diameter of the fourth central hole of the controlling circuit board respectively; a step between the first pipe and the second pipe abuts against and is electrically connected to the top surface of the driving circuit board, and a step between the second pipe and the third pipe abuts against and is electrically connected to the top surface of the controlling circuit board; the second pipe defines an extending hole for communicating the inner space of the second pipe with the negative chamber.

14. The electronic cigarette as described in claim 6, wherein the controlling device comprises a first pluggable conductive body, a second pluggable conductive body and a third pluggable conductive body, which are arranged on a top surface of the controlling circuit board; the second pluggable conductive body is electrically connected to one of a cathode and an anode of the battery device, and the third pluggable conductive body is electrically connected to the other of the cathode and anode of the battery device; the first pluggable conductive body is electrically connected to the third pluggable conductive member via the controlling circuit board.

15. An electronic cigarette, comprising an air switch, wherein the air switch comprises a switch body and an airflow channel extending through the switch body;
the electronic cigarette further comprises a battery device and an atomizer device mounting base; wherein the battery device comprises a cylindrical body and a second air flowing pipe extending axially through the cylindrical body, the second air flowing pipe is connected to an end of the first air flowing pipe;
the atomizer device mounting base communicates with an end of the second air flowing pipe away from the first air flowing pipe; the battery device further comprises comprising a first pluggable conductive member, a second pluggable conductive member, a third pluggable conductive member, a fourth pluggable conductive member, and a fifth pluggable conductive member, the first and second pluggable conductive members face the atomizer device mounting base, the third pluggable conductive member, the fourth pluggable conductive member, and the fifth pluggable conductive member face the air switch; the first pluggable conductive member is electrically connected to one of an anode and a cathode of the battery device directly, the second pluggable conductive member is electrically connected to the third pluggable conductive member directly; the third pluggable conductive member, the fourth pluggable conductive member, and the fifth pluggable conductive member engage with the first pluggable conductive body, the second pluggable conductive body, and the third pluggable conductive body respectively, the third pluggable conductive body is electrically connected to the other one of the anode and cathode of the battery device.

16. the electronic cigarette as described in claim 15, wherein the atomizer device mounting base comprises a main body, a supporting bear for mounting the atomizer device, and two fourth pluggable conductive bodies mounted to the bottom of the main body, the fourth pluggable conductive bodies engage with the first pluggable conductive member and the second pluggable conductive member respectively.

17. The electronic cigarette as described in claim 16, wherein the main body comprises a top end surface and a bottom end surface opposite to the top end surface; the center of the top end surface recesses to form a receiving portion for receiving the supporting bear, the main body further defines a fifth central hole and two mounting holes arranged at opposite sides of the fifth central hole, the second central hole and the mounting holes extend from the bottom of the receiving portion to the bottom end surface, the second central hole is used for allowing air circulation, the mounting holes are used for mounting the fourth pluggable conductive bodies respectively.

18. The electronic cigarette as described in claim 17, wherein the supporting bear comprises a base, and a supporting post extending from the center of the top surface of the base, and a sixth central hole axially extending through the supporting post and the base, the base is received in the receiving portion, the sixth central hole faces and communicates with the fifth central hole, the top surface of the base further recesses to define two holes, the holes are blind holes, the holes are arranged at opposite sides of the supporting post and correspond to the mounting holes respectively.

19. The electronic cigarette as described in claim 15, wherein the switch body comprises an airflow sensor for sensing air passing through the airflow channel and a controlling device electrically connected to the airflow switch; the airflow sensor comprises a negative chamber communicating with the airflow channel, a balance chamber communicating with the outside of the air switch, a first electrode plate and a second electrode plate parallel to and being spaced apart from the first electrode plate; the second electrode plate comprises a conductive film, the conductive film is arranged between the negative chamber and the balance chamber, and cooperates with the first electrode plate to form a parallel-plate capacitor to detect a difference in the pressure between the negative chamber and the balance chamber; the parallel-plate capacitor is electrically connected to the controlling device, to transmit the difference signal to the controlling device.

20. The electronic cigarette as described in claim 19, wherein the switch body comprises a first air flowing pipe, a conductive case, a light emitting device, a first conductive bracket, an insulating gasket, and a second conductive bracket; the first air flowing pipe defines the airflow channel; the case comprises an annular bottom wall, a cylindrical sidewall protruding from an outer edge of the bottom wall, and a top wall fixed to a top end of the cylindrical sidewall away from the bottom wall; wherein the light emitting device comprises a driving circuit board, and a light emitting member fixed to a bottom surface of the driving circuit board; the driving circuit board defines a first central hole for allowing the second air flowing pipe extending through, and a plurality of first apertures arranged at a side of the first central hole; the driving circuit board is mounted on a top surface of the bottom wall and is electrically connected to the bottom wall; wherein the first conductive bracket is arranged on the top surface of the driving circuit board and is electrically connected to the driving circuit board; the first electrode plate is electrically connected to a top end of the first conductive bracket, the first electrode plate defines a second central hole for allowing the air flowing pipe extending through, and a plurality of second apertures; the second aperture are arranged surrounding the second central hole; The conductive film defines a third central hole for allowing the air flowing pipe extending through, the conductive film is mounted on the insulating gasket and is insulated from the first electrode plate, to cooperate with the second electrode plate to form a parallel-plate capacitor; the second conductive bracket is mounted on and electrically connected to the conductive film; wherein the controlling device comprises a controlling circuit board, the controlling circuit board define a fourth central hole for allowing the first air flowing pipe extending through, the controlling circuit board is disposed in the clearance between the top wall of the case and the top end surface of the second conductive bracket, and is electrically connected to the top wall and the second conductive bracket; wherein the first air flowing pipe extends through the first central hole, the second central hole, the third central hole and the fourth central hole, and further electrically connect an inner wall of the controlling circuit board with the inner wall of the driving circuit board; wherein the conductive film, the first conductive bracket, the driving circuit board, the insulating gasket and the second air flowing pipe cooperatively define the balance chamber; the conductive film, the second conductive bracket, the controlling circuit board and the first air flowing pipe cooperatively define the annular negative chamber.

* * * * *